United States Patent [19]

Yoon

[11] Patent Number: 4,519,342
[45] Date of Patent: May 28, 1985

[54] ALCOHOL DISSOCIATION REACTOR FOR MOTOR VEHICLES

[75] Inventor: Heeyoung Yoon, McMurray, Pa.

[73] Assignee: Conco Inc., Wilmington, Del.

[21] Appl. No.: 624,360

[22] Filed: Mar. 23, 1984

Related U.S. Application Data

[63] Continuation-in-part of Ser. No. 414,744, Sep. 3, 1982, Pat. No. 4,444,158.

[51] Int. Cl.³ .............................................. F02M 25/06
[52] U.S. Cl. ....................................... 123/3; 123/1 A; 123/DIG. 12; 60/320
[58] Field of Search .................. 123/1 A, 3, DIG. 12; 60/320

[56]  References Cited

U.S. PATENT DOCUMENTS

| | | | |
|---|---|---|---|
| 1,717,767 | 6/1929 | Diaz | 123/3 |
| 2,295,209 | 9/1942 | Guiles et al. | 123/3 |
| 3,828,736 | 8/1974 | Koch | 123/3 |
| 4,174,954 | 11/1979 | Küsebauch et al. | 123/3 |
| 4,210,103 | 7/1980 | Dimitroff et al. | 123/3 |
| 4,226,213 | 10/1980 | Bernauer | 123/3 |
| 4,475,484 | 10/1984 | Filho et al. | 123/3 |

Primary Examiner—E. Rollins Cross
Attorney, Agent, or Firm—William A. Mikesell, Jr.

[57]  ABSTRACT

A reactor apparatus comprising a reaction chamber having a wall, inlet means operatively connected to a methanol source, and outlet means connected to an internal combustion engine, inner fins along the chamber wall, dissociation catalyst material within the chamber, an outer housing surrounding the reaction chamber and having an inlet connected to the exhaust of the engine and an outlet, and combustion catalyst within the space between the chamber wall and the outer housing.

3 Claims, 3 Drawing Figures

ALCOHOL DISSOCIATION REACTOR FOR MOTOR VEHICLES

RELATED APPLICATIONS

This application is a continuation-in-part of a division of U.S. Ser. No. 414,744 filed Sept. 3, 1982 now U.S. Pat. No. 4,444,158.

BACKGROUND OF THE INVENTION

Kosaka et al U.S. Pat. No. 4,088,450 discloses a plurality of catalysts arranged in a desirable order based on the temperature gradient existing in the chamber for reaction. The operating temperature of the catalysts and the temperature of the portion of the reaction chamber it is in, are matched so as to avoid a catalytic degradation and/or catalytic inactivity.

Peterson et al U.S. Pat. No. 4,282,835 provides for synthesizing CO and $H_2$ fuel from methanol and water in a second synthesizer. The methanol is confined in an alcohol tank as a liquid. The water is confined in a water tank. A fuel pump and a water pump force fuel and water to a mixing valve. A heat exchanger heats the fuel and water to a gas which passes through nickel on alumina catalyst at 500° C. where the methanol dissociates to $CO+H_2$. The gas passes to a second synthesizer containing Fe on Alumina catalyst above 500° C. where water and carbon monoxide form hydrogen and carbon dioxide. The gas is then mixed with air and passes to the engine.

In my U.S. Pat. No. 4,378,336, issued Mar. 29, 1983, there is disclosed a monolith reactor having catalytic material on both sides of its heat exchange surface.

SUMMARY OF THE INVENTION

This invention relates to a reactor apparatus useful for preparing methanol fuel for an internal combustion vehicle engine, and for extracting heat values from and decreasing pollutant content of the exhaust of the engine.

According to the invention there is provided a reaction chamber contained within an outer housing. The reaction chamber contains a dissociation catalyst such that methanol passed into the chamber will be dissociated into hydrogen and carbon monoxide; this gas mixture leaves the reaction chamber and serves as fuel for an internal combustion engine. The engine exhaust gas, which normally contains some incompletely combusted materials, is passed into contact with a combustion catalyst contained in the space between the outer housing and the reaction chamber. The resulting heat of combustion passes through the chamber wall to provide a portion of the heat required for the endothermic dissociation, and this final combustion also serves to reduce engine exhaust emission of undesired products.

In one embodiment, the internal wall of the reaction chamber is provided with a plurality of longitudinal fins which extend into the dissociation catalyst mass. In another embodiment, heat transfer fins are also provided on the exterior of the chamber wall. These latter fins can be coated with a combustion catalyst.

DETAILED DESCRIPTION OF THE INVENTION

Figure 1:
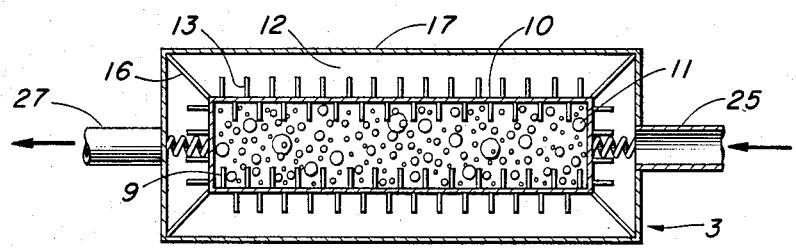
FIG. 1 is a cross-sectional view of a reactor in accordance with the present invention.
Figure 2:
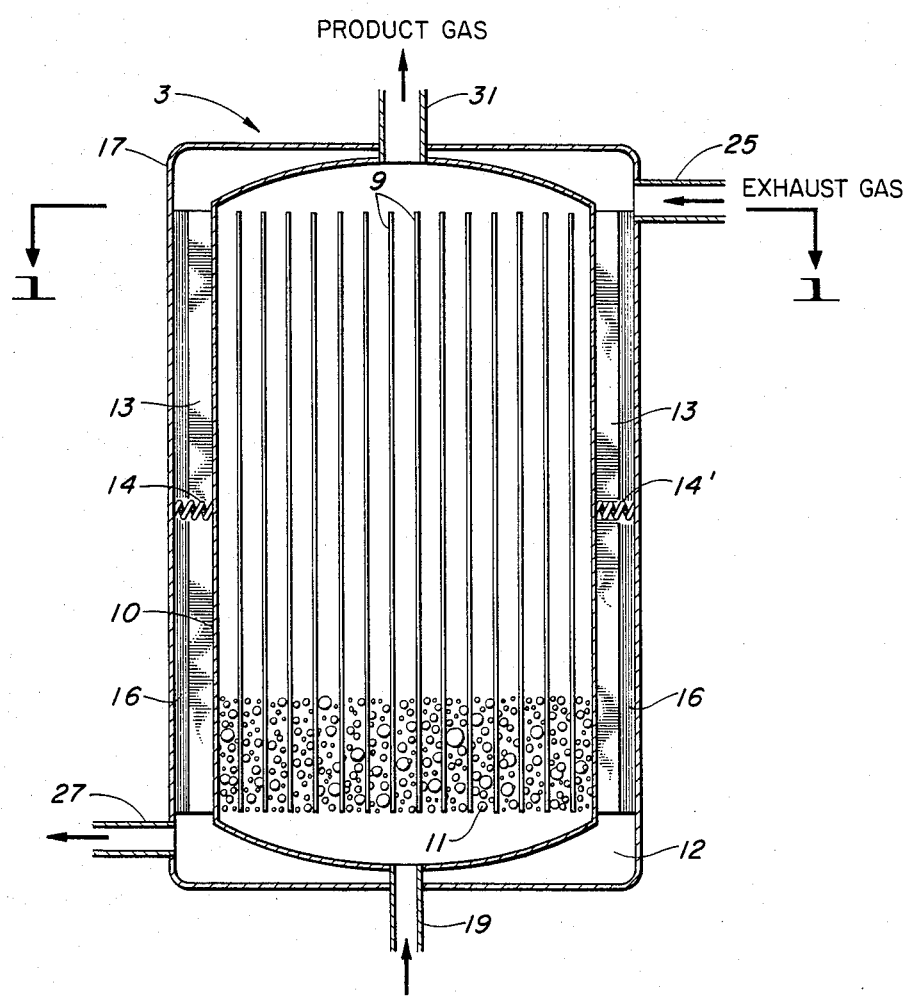
FIG. 2 is a longitudinal cross-sectional view of a reactor in accordance with the present invention.

With reference to the drawings, and to FIGS. 1 and 2 in particular, a reaction chamber 10 is supported within reactor 3 by supports 16 and/or by springs 14 and 14'. The reactor chamber wall 10 encloses the catalyst bed material 11. Inner fins 9 extend from the reaction chamber wall 10 to which they are attached. The inner fins extend from the reaction chamber wall inwardly into the reaction chamber defined by the reaction chamber wall. Outer fins 13 are connected to the reaction chamber wall 10. Outer fins 13 extend outwardly from the reaction chamber wall 10 into the heat exchange chamber 12. The heat exchange chamber 12 is defined by the inner surface of the heat exchange wall 17 and the outer surface of the reaction chamber wall 10.

According to the present invention, the surfaces of heat exchange chamber 12 which contact exhaust gas introduced through line 25 are treated with an oxidation or combustion catalyst, such as the noble or base metal catalysts currently being used for automobile exhaust treatment. If desired, chamber 12 can contain particulate combustion catalyst, not shown, in lieu of or in addition to the surfaces being coated with an adhered catalyst.

As shown in FIG. 2, the heat exchange wall 17 encloses the reaction chamber wall 10. The supporting spring means 14 and 14' are connected to the inner surface of the heat exchange wall 17 and the outer surface of the reaction chamber wall 10.

The fins 9 and 13 extend the length of the reaction chamber wall. Both the inner fins 9 and the outer fins 13 serve to distribute heat along the reaction chamber wall. Inner fins 9 serve to distribute heat into the reactor bed 11 from the reaction chamber wall 10. The outer fins 13 serve to transfer heat from the heat exchange chamber 12 into the reaction chamber wall 10.

The ends of reaction chamber wall 10 are preferably covered by a screen or wire mesh (not shown) to retain the catalyst bed 11 therein.

Figure 3:
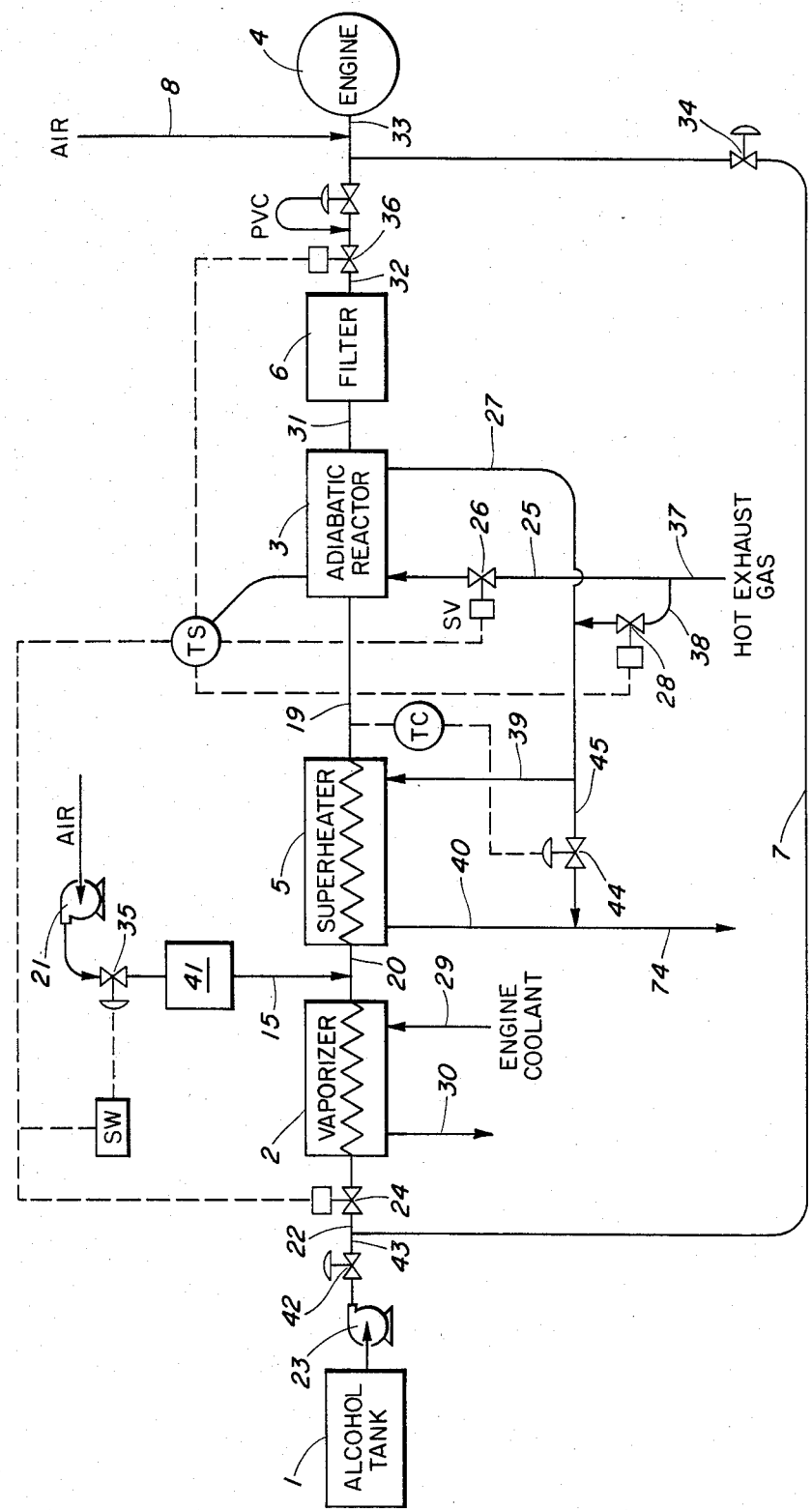
FIG. 3 is a schematic flow diagram of an automobile fuel system in accordance with the present invention.

Referring next to FIG. 3, reactor 3 is connected by conduit 19 to a superheater 5. The superheater 5 receives vapor phase alcohol from the vaporizer 2 through line 20. Air is pumped through line 15 from compressor 21 into line 20. The mixture of air and methanol vapor passes through line 20 to the superheater 5. Alcohol from the alcohol tank 1 is pumped through line 22 by pump 23 to the vaporizer 2. Valve 24 in line 22 is provided to limit the flow of liquid alcohol to the vaporizer 2 from the alcohol tank 1. The mixture of air and alcohol vapor passes through line 19 into the reactor 3. The reactor 3 is heated by exhaust gas from the engine 4. The exhaust gas passes through line 25 to the reactor 3. The combustion catalyst contained within chamber 12 of reactor 3 causes more complete oxidation of any remaining methanol and partial combustion products within the exhaust gas, thus reducing exhaust emissions. Also, the heat of combustion is transferred by way of fins 13 and 9 through wall 10, where it provides additional heat to the endothermic dissociation in chamber 10. The line 25 has valve 26 therein to limit the flow of exhaust gas to the reactor 3. Exhaust gas leaves the reactor 3 through line 27. The vaporizer 2 is provided with a line 29 through which hot engine coolant is passed from the engine to the vaporizer 2. Engine coolant passes from the vaporizer 2 through line 30. Line 30 is connected to engine 4. The filter 6 is connected to the reactor 3 by line 31. The filter 6 removes solids from the hydrogen rich gaseous mixture passing therethrough. The filter 6 is connected by line 32 to the engine 4. Valve 36 in line 32 is provided to limit the flow of the hydrogen rich gaseous fuels in the engine. The valves 24 and 36 completely block the dissociation system including vaporizer to the filter when the system is not in operation. Line 8 introduces combustion air to the engine and is connected to the line 33. Line 33 is connected to the engine 4. Hydrogen rich gas in line 32 mixes with air from line 8 in the line 33. Liquid alcohol passes through line 7 to line 33. The valve 34 in line 7 limits the flow of liquid alcohol therethrough. The liquid alcohol passing through line 7 is atomized prior to being fed to the engine 4.

The preferred alcohol for use as the alcohol fuel in the alcohol tank 1 is methanol.

The engine is started by methods known in the art for starting internal engines for example by use of an alternate fuel such as liquid methanol delivered through line 7 or a gaseous fuel like propane. After starting the engine, the hot exhaust gases heat the reactor 3 by passing through the heat exchange chamber 12. The outer fins 13 conduct sensible and combustion heat from those hot exhaust gases and transmit it to the reaction chamber wall 10. The fins 9 transfer heat from the reaction chamber wall 10 into the reaction bed 11. When the initial operating temperature is reached, the mixture of air and methanol vapor are fed to the reactor. Preferably the reactor contains a dual catalyst bed. The initial catalyst contacted by the mixture of air and methanol vapor being a partial oxidation catalyst for example copper/nickel. The subsequent catalyst contacted by the alcohol and partial combustion product mixture being a dissociation catalyst such as copper/zinc catalyst. Partial combustion occurs between the methanol and the air in the initial stage of the reactor 18. This partial combustion produces heat. The heat produced in the initial stage of the reactor 3 is transferred to the subsequent stage by the inner fins 9.

Once the catalyst bed is preheated to the initial reaction temperature by the engine exhaust gas, valve 26 is closed and valves 24, 35 and 36 are opened by temperature switch. Valve 28 in line 38 is first opened to send hot exhaust gas to the superheater 5 before closing valve 26. The reaction temperature within the reactor 3 is maintained by the rate of partial combustion. The rate of partial combustion is controlled by the amount of air injected through line 15 by control of valve 35. Valve 35 is temperature responsive to the outlet gas temperature in line 31. Valve 35 is connected to line 31 by temperature control signal. The temperature control in line 31 is not shown. Valve 35 is also connected to line 22 by flow rate sensor signal. The flow rate sensor signal sets the maximum opening of valve 35 at the measured alcohol flow rate. The temperature control signal reduces the opening of valve 35 to lower the air flow rate from the maximum if the temperature is over the specified upper limit of the product gas temperature. This air flow control may be done by a microprocessor, not shown.

During cold start up, exhaust from the engine passes into the heat exchange chamber of reactor 3 through line 25 and valve 26. The exhaust leaves the heat exchange chamber through line 27. While the reactor is being heated up to the operational temperature, valve 28 in line 38 is closed so that exhaust from line 37 passes into line 25 and into the heat exchange chamber of the reactor 3. The exhaust gas leaving the reactor 3 through line 27 enters the superheater 5 through line 39 and leave the superheater through lines 40 and 74 to vent. Valve 44 in line 45 is closed during this period. During this period the vaporizer 2 is heated with engine coolant. Alcohol dissociation begins in the reactor. The valve 44 controls the exhaust gas flow to the superheater 5 to give the temperature of the methanol vapor from the superheater 5 at the specified inlet temperature for the reactor 3. The vaporizer 2 is optional. Thus, liquid methanol may be fed directly into the superheater 5 from the methanol or alcohol storage tank 1. Alternatively engine exhaust may be passed from the output line 40 of the superheater 5 into the feedline 29 of the vaporizer 2, in which case engine coolant would not be fed into the feedline 29 of vaporizer 2.

The air being fed through line 15 may be preheated by preheater 41. The preheater 41 may be fed exhaust from line 37 to provide the preheating heat for air being fed through line 15 into line 20. Beneficially, the preheated air does not lower the temperature of the liquid alcohol and/or alcohol vapor being fed to the superheater 5 through line 20.

The reactor 3 preferably is provided with insulation over the heat exchange wall 17 to maintain the temperature therewithin and minimize the transfer of heat therefrom. As an alternative to valve 26, a restricting orifice may be provided. During cold start hot exhaust gas flows through the orifice to the reactor to preheat the catalyst bed in reactor 3 to operating temperature by closing the valve 28 in line 38. When the reactor 3 is in operation, the orifice allows only a portion of hot exhaust gas to flow to the reactor 3 with the balance of the exhaust gas flowing through line 38 by opening the valve 28. In the manner, this heat loss from the reactor 3 can be minimized and some heat recovery from the exhaust gas may be realized in the reactor.

One function of exhaust within the heat exchange chamber of the reactor 3 can be to initially heat up the reactor 3 and then to sustain heat losses to the atmosphere to maintain the temperature of the reaction chamber 11 free from heat loss to the atmosphere. After the initial heat up of the reactor 3 to the operating temperature, a major portion of the exhaust in line 37 may be passed to the vaporizer and/or superheater. Thus only a small portion of the exhaust is required to make up for heat losses from reactor 3 to the surrounding atmosphere. According to the present invention, reactor 3 serves to complete the combustion of any remaining partially combusted compounds in the engine exhaust, thus reducing undesired emissions and providing a source of endothermic dissociation heat. Depending on the efficiency of combustion within the engine, a greater or lesser proportion of exhaust gas by-passes reactor 3. And the greater the proportion of dissociation heat recovered from the exhaust, the lesser is the amount of air required in line 15.

Physical Configuration and Functions of Reactor Components

FIGS. 1 and 2 show the schematics of reactor 3. The reactor has two divided sections: the inner section holding the catalyst bed and the surrounding combustion chamber. The reaction chamber wall 10, separating the catalyst bed 11 and the heat exchange chamber 12, has inside fins 9 and outside fins 13. During cold starts the hot engine exhaust gas flows through and is oxidized additionally in the heat exchange chamber to provide the heat required for preheating the bed to a desired temperature. The fins on the reaction chamber wall will enhance the heat transfer and, thus, reduce the preheating time. During normal dissociation operation, the heat exchange chamber can be isolated from the exhaust gas flow and, thus, acts as insulation. The feed to reactor 3 is a mixture of superheated methanol and air. For thermally neutral conversion of methanol, the air/methanol ratio in the feed and the reactor inlet temperature are controlled.

The fins inside and outside of the reaction chamber wall are placed parallel to the flow directions of the reactants in the bed and of the exhaust gas in the heat exchange chamber, respectively, in order to minimize the pressure drops in both flows.

The inside fins on the reaction chamber wall have important functions for maintaining catalyst activity and physical integrity. During reactor operation the fins will help to maintain a more even temperature distribution in the bed by facilitating longitudinal heat transfer. This heat transfer effect is beneficial to the maintenance of the catalyst activity by reducing the peak temperature generated by the reaction between methanol and oxygen in the front partial combustion zone of the catalyst bed, since a higher temperature deactivates catalyst more by sintering. Further, the inside fins may be beneficial for catalyst pellet integrity by restricting pellet motion resulting from sudden changes in car speed or car vibrations due to rough road conditions.

As shown in FIG. 2, springs 14 and 14' or some other mechanical means of dampening motion may be installed in the heat exchange chamber to absorb any abrupt movements of the automobile without detrimentally affecting catalyst physical integrity.

Because a rapid preheating of the catalyst bed by heat exchanger is required during cold starts, a reaction chamber wall shape that gives a larger heat transfer area is preferred at the same catalyst volume. For this reason, the reaction chamber wall also has many inside fins 9 and outside fins 13. FIGS. 1 and 2 show a configuration of the reactor. FIG. 1 shows that the reaction chamber wall in the reactor has a large width-to-depth ratio in order to have a large peripheral surface area at the same volume.

Since the reactor must fit into the available space in an automobile, the reactor size and shape must correspond to that space.

Overall Fuel System

FIG. 3 shows a schematic flow diagram of the automobile fuel system of the invention. Major components of the fuel system are a vaporizer 2, a superheater 5, a filter 6, and by-pass line 7 in addition to the reactor.

In the vaporizer 2 the engine coolant, normally at 200°–220° F., provides the heat for the methanol vaporization. In the superheater, the methanol temperature is raised to the desired reactor inlet temperature by heat exchange with the exhaust gas. The vaporizer 2 is optional because the superheater may be used for the methanol vaporization and superheating by directly feeding liquid methanol into it. Air is injected through line 15 to the alcohol feed stream normally before the superheater in order to allow enough time for mixing of the air and alcohol prior to the reactor. The filter 6 collects fines from the catalyst bed.

The by-pass line 7 delivers liquid alcohol directly to the engine as required during cold start or high load driving (acceleration or high speed driving). During cold start, the engine 4 must run on liquid or vaporized alcohol until the dissociation reactor completes its start-up phase. During high load driving the fuel requirement in excess of the maximum throughput of the reactor is provided with liquid alcohol from tank 1 delivered through the by-pass line 7.

The direct feeding of liquid alcohol in excess of the maximum throughput of the reactor may be beneficial for overall car performance without significantly reducing the benefits of the dissociation. The liquid alcohol fed to the engine will boost the engine power by increasing the energy density of the combined fuel when the power is needed at high load conditions. Further, it may lower the $NO_x$ emissions by reducing the combustion temperature in the engine.

The preferred operating mode for the dissociated methanol engine is to operate for maximum efficiency at low-load driving conditions, and for maximum performance at high-load transient driving conditions. Low-load operation consisting of idle and constant speed driving does not require a high power output from the engine. For low-power output, the engine can be operated at a maximum air-fuel ratio or a minimum equivalence ratio to give maximum efficiency. With dissociated methanol the equivalence ratio can be reduced as low as 0.3 without hampering smooth engine operation due to its high hydrogen content. For maximum power output, methanol in excess of the reactor throughput can be by-passed and fed directly into the engine. Air flow is unthrottled. The result is an increase in fuel density up to an equivalence ratio of 1.0, which gives maximum power output.

Operation can be accomplished with a driver controlled accelerator that sends a signal to a microprocessor, which in turn monitors and adjusts engine performance as necessary. The micro-processor is not shown in FIG. 3. Adjustments such as spark advance, air-fuel ratio, etc. are made. The micro-processor maintains the required air-fuel ratio during low-load driving demand by throttling the air flow to the engine. During high-load transient demands, such as acceleration to cruise speed and hill climbing is required, additional fuel as liquid methanol is injected by opening by-pass valve 34. In this mode, air-fuel ratio varies as fuel density is adjusted to give the required engine power output and hence good driving performance.

EXAMPLE

Cold Starts

Since the cold start of the reactor requires hot engine exhaust gas for preheating of the catalyst bed the engine 4 must be started by a method independent of the methanol conversion system. During this period the engine may run on liquid alcohol delivered through the by-pass line.

Once the catalyst bed temperature in the reactor has risen to the initial operating temperature, superheated alcohol is fed to the reactor with air injection through line 15. Because of the exothermic heat generated by partial combustion of alcohol, the catalyst bed temperature will further rise until endothermic alcohol dissociation becomes effective.

For a 20/10 Cu/Ni catalyst on silica the bed temperature for initiating the partial combustion reaction for methanol is about 300° F. or above. A lower temperature is acceptable if a more active catalyst is used.

The engine can be started independently with a gaseous start-up fuel such as propane, electrically vaporized methanol or finely atomized methanol.

Adiabatic Alcohol Conversion

Once the cold start phase of the reactor is completed, the reactor can be operated adiabatically with air injection rate controlled at a fixed $O_2$/methanol molar ratio in the feed for thermally neutral, adiabatic conversion. The $O_2$/methanol feed ratio is normally 0.16 or less for the adiabatic conversion. The ratio is less than the theoretical number of 0.174 because of the exothermic formation of such by-products as methane and dimethyl ether in very small quantities. When the methanol conversion goes to completion at the air injection rate and there is no heat loss from reactor to surroundings, the product gas temperature is the same as the feed temperature.

With a dual catalyst bed of Cu/Ni and Cu/Zn catalysts, the following three reactions take place as major reactions $$CH_3OH\ (g) + \tfrac{1}{2} O_2 \rightarrow H_2 + CO + H_2O\ \Delta H_{298} = -36{,}134\ \text{cal} \quad (I)$$
$$CH_3OH\ (g) \rightarrow 2\ H_2 + CO\ \Delta H_{298} = 21{,}664\ \text{cal} \quad (II)$$
$$H_2O\ (g) + CO \rightarrow H_2 + CO_2\ \Delta H_{298} = -9{,}838\ \text{cal} \quad (III)$$

Methanol is first converted via Reactions (I) and (II) in the Cu/Ni catalyst zone and the remaining methanol is converted via Reactions (II) and (III) in the following Cu/Zn catalyst zone. Because Reaction (I) is very fast on a Cu/Ni catalyst, oxygen is rapidly consumed to completion in the zone. The rapid progress of Reaction (I) creates a temperature peak in the zone. After the depletion of oxygen the endothermic reaction (Reaction (II)) becomes dominant and, thus, cools down the bed temperature. The gas leaving the reactor is very close to equilibrium for the water/gas shift reaction because of the excellent shift activity of the Cu/Zn catalyst.

Having thus described the invention by reference to certain of its preferred embodiments it is pointed out that embodiments described are illustrative rather than limiting in nature and that many variations and modifications are possible within the scope of the present invention.

Having thus described the invention, I claim:

1. A reactor for providing fuel vapor to and for treating exhaust gases from an internal combustion engine, which reactor comprises:
   (a) elongated reaction chamber means having inlet and outlet means disposed at substantially opposed ends of said chamber means,
   (b) a plurality of longitudinal fins on the interior wall of said chamber means,
   (c) a mass of particulate dissociation catalyst arranged within said chamber means and in heat exchange contact with said fins,
   (d) means for supplying methanol to said inlet means, and means for conveying gaseous dissociation product from said outlet means to the fuel intake of said engine,
   (e) housing means surrounding said chamber means and having a gas supply opening and a gas discharge opening, said openings being disposed in substantially opposed faces of said housing means, and
   (f) means for conveying exhaust gas from said engine to said gas supply opening.

2. A reactor for providing fuel vapor to and for treating exhaust gases from an internal combustion engine, which reactor comprises:
   (a) elongated reaction chamber means having inlet and outlet means disposed at substantially opposed ends of said chamber means,
   (b) a plurality of longitudinal fins on the interior wall of said chamber means,
   (c) a mass of particulate dissociation catalyst arranged within said chamber means and in heat exchange contact with said fins,
   (d) means for supplying methanol to said inlet means, and means for conveying gaseous dissociation product from said outlet means to the fuel intake of said engine,
   (e) housing means surrounding said chamber means and having a gas supply opening and a gas discharge opening, said openings being disposed in substantially opposed faces of said housing means,
   (f) combustion catalyst within the space between said chamber means and said housing means, and
   (g) means for conveying exhaust gas from said engine to said gas supply opening.

3. The reactor of claim 2 further comprising a plurality of fins on the exterior wall of said chamber means.

* * * * *